Jan. 20, 1931.  R. H. CHILTON  1,789,725

RUBBER SPRING SHACKLE

Filed June 1, 1926

Inventor
Ralph H. Chilton
By Spencer Sewall & Hardman
his Attorneys

Patented Jan. 20, 1931

1,789,725

UNITED STATES PATENT OFFICE

RALPH H. CHILTON, OF DAYTON, OHIO, ASSIGNOR TO THE INLAND MANUFACTURING COMPANY, OF DAYTON, OHIO, A CORPORATION OF DELAWARE

RUBBER SPRING SHACKLE

Application filed June 1, 1926. Serial No. 112,780.

This invention relates to non-metallic shackles interposed between two parts having relative movement, and has particular reference to shackles for connecting the springs to the chassis frame of a vehicle.

An object of the invention is to provide an improved form of non-metallic shackle which gives long life to the non-metallic material due its greater bearing area and relatively small amount of distortion when in use.

Another object is to provide such a shackle having a positive stop to the relative lateral movement of the parts and hence positively limit the sidesway of the chassis frame.

Another object is to provide such a shackle having elastic material encased in a housing and having provisions for preventing dirt, mud, etc., from working its way into the housing and thereby causing rapid deterioration of the elastic material.

Another object is to provide a non-metallic pivot shackle which is capable of transmitting the spring thrust to the chassis frame in either direction and hence can transmit the driving thrust of the Hotchkiss type drive or the reverse thrust which occurs during the application of the brakes or during backing up. Of course, in the case of the front axle springs, the driving thrust is the tractive force exerted by the chassis frame upon the front axle assembly through the springs.

Further objects and advantages of the present invention will be apparent from the following description, reference being had to the accompanying drawings, wherein a preferred form of embodiment of the present invention is clearly shown.

In the drawings.

Similar reference character refer to similar parts throughout the several views.

Figure 4:
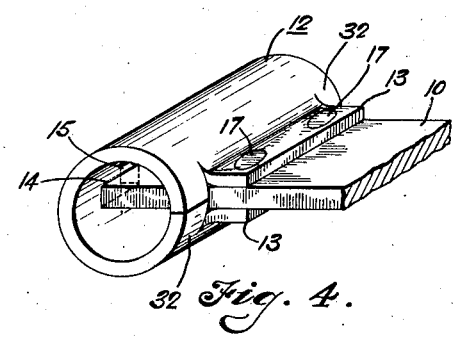
Fig. 4 is a perspective view of the bearing member secured to the end of the long spring leaf.

Numeral 10 designates the long leaf of one of the leaf springs 11 which support the chassis frame upon the rear axle. A bearing member 12 is rigidly secured to the end of the leaf 11 by some suitable means. In the drawings this member 12 is shown as a pressed metal cylinder of substantially greater lateral dimension than the spring leaf 10, and having the metal flanges 13 integral therewith, as clearly shown in Fig. 4. The outer end of the leaf 10 is cut away to provide a shoulder 14 on each side and the projecting central tongue 15 which fits sungly within the slot 16 in the member 12. The two flanges 13 are rigidly secured to the leaf 10 by the two rivets 17, or by brazing, welding, or by other suitable means.

Figure 1:
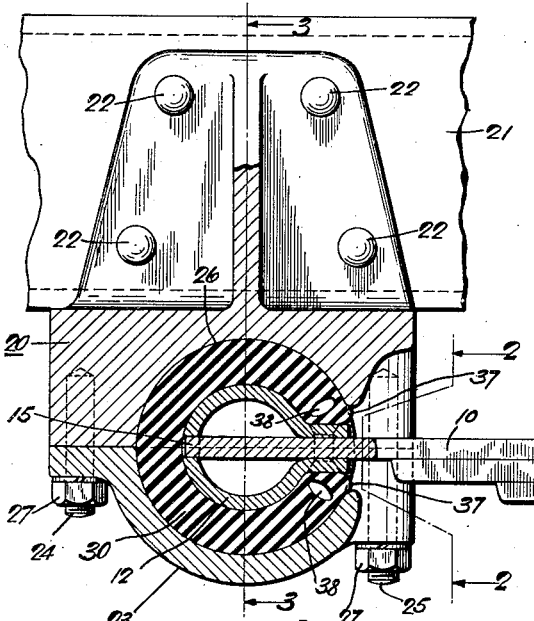
Fig. 1 illustrates a shackle made according to this invention connecting the front end of a rear spring of an automobile to the chassis frame. The section is taken on line 1—1 of Fig. 3.
Figure 2:
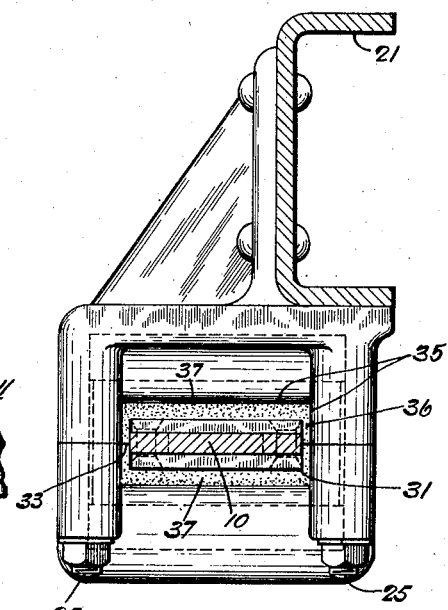
Fig. 2 is an end view of Fig. 1, the section of the spring being on line 2—2 of Fig. 1.
Figure 3:
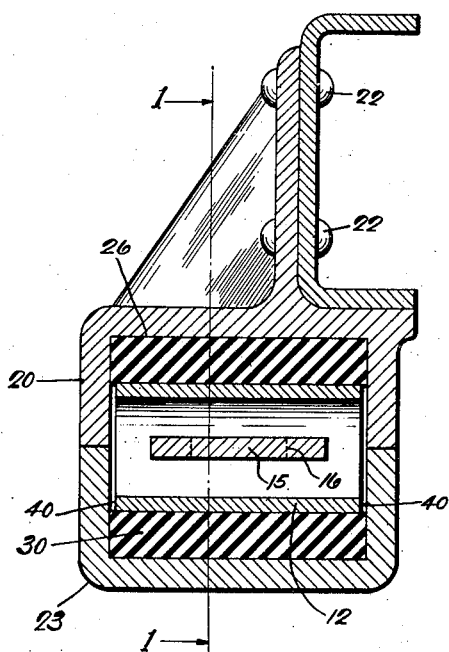
Fig. 3 is a vertical section on line 3—3 of Fig. 1.

A housing member 20 is rigidly fixed to the side rail 21 of the chassis frame by suitable means such as by the rivets 22. This member 20 has a complementary cap 23 which is clamped in place by the four studs or bolts 24 and 25 with suitable nuts and lock washers, thus forming a cylindrical recess or seat 26. The bearing member 12 is inserted within an elastic rubber block 30 whose outside dimensions are substantially those of the cylindrical seat 26. The block 30 has a rectangular opening 31 providing space for the flanges 13 and leaf 10 but completely encircles the laterally projecting ends 32 of the member 12, as shown in Fig. 2. In order to permit the insertion of the member 12 in block 30 the block is split at its end portions on line 33 (see Fig. 2) so that the block may be easily distorted for the insertion of the member 12 when fixed to the end of leaf 10. The block 30 having been assembled upon the end of the spring, it is set up snugly within the recess 26 of housing 20 and the cap 23 bolted in place. The block 30 is of such dimension that when the nuts 27 are drawn up the rubber is put under compression and forced in tight contact with the inner walls of the seat 26 and the outer walls of the member 12. The two portions of the housing together provide an opening 35 which provides sufficient clearance for the pivotal movement of the spring without contacting with the metal housing. Also a small lateral clearance 36 is provided to prevent edgewise contact of spring leaf 10 with the sides of the opening 35. When the rubber block 30 is compressed by clamping down the cap 23 the rubber will bulge outwardly at the opening 35 a small amount, as shown at 37 in Fig. 1. These bulges 37 prevent mud, dirt, etc., from entering the housing and thereby causing rapid deterioration of the rubber. Preferably the rubber block 30 is provided with laterally extending holes or recesses 38 which are located within the block 30 so that dirt cannot gain access thereto but in relatively close proximity to the bulges 37. In Fig. 1 the originally round holes 38 are illustrated as having been somewhat flattened out by the flow of rubber when the block 30 was put under compression as above described. These holes 38 provide a space for the rubber to flow when the spring pivots within the rubber block 30 and thus minimizes the tendency for the rubber to bulge out excessively at the crevices 37. Preferably the holes 38 extend throughout the lateral width of the block 30 and are closed at the ends thereof by the end walls of the housing. These holes should be made of such size as to provide sufficient space for the rubber to flow to prevent excessive bulging at opening 35 but no larger, since they limit to a certain extent the amount of compression obtainable in the rubber block 30.

In operation, the bearing member 12 pivots upon the elastic rubber block 30 by the internal distortion of the rubber and no slipping occurs between the rubber and the seat 26 or the surface of member 12. The member 12 has a small lateral clearance 40 at each side and during all ordinary pivotal movements of the spring remains isolated from the metal housing since it is kept centered within the housing by the end portions of block 30 engaging the lateral edges of the flanges 13 and leaf 10 as well as by the non-slipping bond between member 12 and the block 30. However, when there is a great side thrust on the chassis frame, as when turning a sharp corner, the ends of the member 12 will abut the side walls of the housing and thus give a positive limit to the amount of side sway possible in any event. The amount of this clearance 40 is determined by the amount of side sway permissible in any given chassis design.

Tractive force forward is transmitted from the leaf 10 to member 12 by the shoulder 14 and rivets 17, and thence through the block 30 over the vertical projected area of member 12 to the metal housing fixed to the side rail 21. Rearward tractive force is transmitted from member 12 through the rubber on the rear side thereof to the housing. The rubber around the lateral projections 32 of member 12 is backed up by the housing on the rear side thereof and hence this portion of block 30 is under direct compression for the transmission of rearward forces. Hence this pivot shackle serves very well to transmit both the forward tractive force of the Hotchkiss type drive, and the rearward tractive force which occurs when backing up or during the application of wheel brakes.

When this pivot shackle is applied to the front end of the front springs the housing member 20 may be slightly modified to form a neat appearing attachment to the usually downwardly curved front end of the chassis side rails 21. When located at the front end of the front springs, the tractive force is transmitted between the frame 21 and the front axle assembly in the same manner as described above for the transmission of rearward tractive forces in the rear spring.

When this pivot shackle is applied to the rear end of the front springs and an extension shackle used at the front end thereof the attachment of housing 20 to the chassis side rails may be as shown in Fig. 1. In this arrangement the front axle assembly will be driven forward by the spring 10 being under compression, which, of course, corresponds to the Hotchkiss type drive for the rear springs. In this arrangement both the forward driving forces and the front wheel braking forces are transmitted through the shackle in the direction in which it is most efficient, since the bearing area on the rubber block 30 is the full vertical projected area of the bearing member 12.

A feature of this pivot shackle is the increase in the bearing area of member 12 on the rubber block 30 for sustaining both the weight load and the tractive or horizontal load by the expedient of increasing the lateral dimension of member 12 substantially beyond the width of spring leaf 10. By this means the load per unit area upon the rubber block may be made small to increase the life of the rubber and permit a more flexible rubber to be used, and at the same time retain the advantage of having a bearing member with a relatively small maximum radius about the pivot axis.

While the form of embodiment of the present invention as herein disclosed, constitutes a preferred form, it is to be understood that other forms might be adopted, all coming within the scope of the claims which follow.

What is claimed is as follows:

1. In combination with the spring and frame of a vehicle, a pivot shackle comprising: a transverse cylindrical bearing member fixed to and enclosing the spring end, a metal housing fixed to the frame and enclosing said bearing member, said bearing member being spaced peripherally from said housing and isolated therefrom by a surrounding bushing of elastic non-metallic material, and being spaced laterally from said housing by a relatively small clearance, whereby the lateral movement of said bearing member within the elastic material is positively limited.

2. In combination with the spring and frame of a vehicle, a pivot shackle for transmitting tractive thrust between said spring and frame comprising: a substantially cylindrical bearing member rigid with the spring end and projecting laterally on both sides of said spring end, a metal housing fixed to the frame and enclosing said bearing member, said bearing member being spaced peripherally from said housing and isolated therefrom by a surrounding bushing of elastic non-metallic material, and being spaced laterally from said housing by a relatively small clearance, whereby the lateral movement of said bearing member within the elastic material is positively limited.

3. In combination with the spring and frame of a vehicle, a pivot shackle for transmitting tractive thrust between said spring and frame comprising: a substantially cylindrical bearing member rigid with the spring end and of materially greater lateral width than said spring end, a metal housing fixed to the frame and enclosing said bearing member, said bearing member being spaced peripherally from said housing and isolated therefrom by a surrounding bushing of elastic non-metallic material, and being spaced laterally from said housing by a relatively small clearance, whereby the lateral movement of said bearing member within the elastic material is positively limited, said housing having an opening for providing clearance with said spring, said opening being of less lateral width than said bearing member, whereby said bearing member is provided with a greater bearing area for backward thrust or braking effort.

4. In combination with the spring and frame of a vehicle, a substantially non-extension pivot shackle comprising: a substantially cylindrical bearing member rigid with the spring end, a metal housing fixed to said frame and enclosing said bearing member and spaced therefrom, an elastic rubber block surrounding said bearing member and normally isolating said member from said housing, said housing having an opening for providing clearance for said spring during pivotal movement thereof, said opening being of less lateral width than said bearing member.

5. In combination with the spring and frame of a vehicle, a substantially non-extension pivot shackle comprising: a bearing member rigid with the spring end, a metal housing fixed to said frame and enclosing said bearing member and spaced therefrom, an elastic substantially annular rubber block surrounding said bearing member and normally isolating said member from said housing, said housing having an opening for providing clearance for said spring during pivotal movement thereof, said opening being of less lateral width than said bearing member.

6. In combination with a supporting leaf spring and frame of a vehicle, a pivot shackle interconnecting said spring and frame and transmitting tractive thrust therebetween, said shackle comprising: a substantially cylindrical transverse bearing member fixed upon the end of said spring and projecting laterally on each side of said spring, an elastic rubber bushing surrounding said bearing member, and a metal housing fixed to said frame and confining said elastic rubber bushing under such high compression as to prevent any substantial to and fro movement of said bearing member within said housing.

7. In combination with a supporting leaf spring and frame of a vehicle, a pivot shackle interconnecting said spring and frame and transmitting tractive thrust therebetween, said shackle comprising: a transverse bearing member fixed upon the end of the long leaf of said spring and projecting laterally on each side thereof, an elastic rubber bushing extending peripherally around the lateral projections of said bearing member, and a rigid housing fixed to said frame and confining said rubber bushing under compression.

8. In combination with a supporting leaf spring and frame of a vehicle, a pivot shackle interconnecting said spring and frame and transmitting tractive thrust therebetween, said shackle comprising: a transverse bearing member fixed upon the end of the long leaf of said spring and having lateral projections on each side thereof, elastic rubber material substantially enclosing said bearing member except at the lateral end surfaces thereof, a rigid housing fixed to said frame and confining said rubber material under compression and backing up said rubber material both in front and back of said lateral projections whereby to resist tractive thrusts upon said shackle in both forward and rearward directions.

9. In combination with a supporting leaf spring and frame of a vehicle, a pivot shackle interconnecting said spring and frame and transmitting tractive thrust therebetween, said shackle comprising: a transverse metal tube having a central slot therein receiving the end of the long leaf of said spring and fixed thereto and having lateral projections on each side of said spring leaf, non-metallic elastic material surrounding said tube and completely encircling said lateral projections, a housing fixed to said frame and confining said elastic material against material to and fro displacement whereby to resist tractive thrusts upon said shackle.

10. In combination with a supporting leaf spring and frame of a vehicle, a pivot shackle interconnecting said spring and frame and transmitting tractive thrust therebetween, said shackle comprising: a transverse bearing member fixed to the spring end and having lateral projections on each side of said spring end, a rigid housing fixed to said frame and enclosing said spring end and transverse bearing member but leaving a chamber therebetween, and elastic rubber substantially completely filling said chamber and completely encircling said lateral projections, whereby pivotal movement of said bearing member is permitted by internal torsional distortion of said rubber, but to and fro movement thereof is substantially prevented.

In testimony whereof I hereto affix my signature.

RALPH H. CHILTON.